(12) United States Patent
Levi

(10) Patent No.: US 9,539,951 B1
(45) Date of Patent: Jan. 10, 2017

(54) MOTORCYCLE TOWING DEVICE

(71) Applicant: Dan Levi, Van Nuys, CA (US)

(72) Inventor: Dan Levi, Van Nuys, CA (US)

(*) Notice: Subject to any disclaimer, the term of this patent is extended or adjusted under 35 U.S.C. 154(b) by 0 days.

(21) Appl. No.: 14/854,335

(22) Filed: Sep. 15, 2015

(51) Int. Cl.
*B60R 9/10* (2006.01)
*B60P 3/12* (2006.01)
*B60R 9/06* (2006.01)
*B60P 3/077* (2006.01)

(52) U.S. Cl.
CPC .................. *B60R 9/10* (2013.01); *B60P 3/077* (2013.01); *B60P 3/125* (2013.01); *B60R 9/06* (2013.01)

(58) Field of Classification Search
CPC ......................................................... B60P 3/125
See application file for complete search history.

(56) References Cited

U.S. PATENT DOCUMENTS

| | | | |
|---|---|---|---|
| 5,145,308 A | 9/1992 | Vaughn et al. | |
| 5,352,083 A * | 10/1994 | Roberts | B60G 17/033 280/402 |
| 5,620,197 A | 4/1997 | Howes | |
| 5,674,044 A * | 10/1997 | Ranes | B60P 3/125 280/402 |
| 6,244,813 B1 | 6/2001 | Cataldo | |
| 8,075,012 B1 | 12/2011 | Perez et al. | |
| 2006/0181058 A1* | 8/2006 | Smith | B60P 3/125 280/492 |
| 2015/0191113 A1* | 7/2015 | Frahm | B60P 3/125 414/484 |

* cited by examiner

*Primary Examiner* — Kevin Hurley

(57) ABSTRACT

The invention provides a device for towing a motorcycle behind a land vehicle with a front wheel of the motorcycle off the ground. The device has a platform connectable via a support bar to a hitch receiver of the towing vehicle. The platform is pivotally connected to the support bar in order to allow the motorcycle to tilts as the towing vehicle turns. The platform has a stationary front stopper for the front side of the motorcycle wheel supported by the platform and a rear stopper which is pivotally connected to the platform and which forms a mechanism for automatically locking the front wheel of the motorcycle from behind when the rear stopper is turned during loading the wheel onto the platform.

9 Claims, 4 Drawing Sheets

MOTORCYCLE TOWING DEVICE

FIELD OF THE INVENTION

The present invention relates to a device for towing a motorcycle, in particular to a device for towing a motorcycle behind a land vehicle with a front wheel of the motorcycle off the ground.

BACKGROUND OF THE INVENTION

To the present time devices for towing motorcycles and the like behind a vehicle have been complex and/or expensive and/or inconvenient. Typically, it has been necessary to secure the motorcycle to a trailer specifically adapted to carry a motorcycle.

It has been proposed to tow a motorcycle behind a vehicle by securing a front wheel of a motorcycle to a tow bar so that the wheel is fixed relative to the vehicle. The steering head of the motorcycle is allowed to rotate so that the motorcycle tilts as the vehicle turns. This arrangement has the disadvantage during backing or a tight turn that the motorcycle may tip over if the steering head is allowed to rotate too far.

For example, U.S. Pat. No. 5,145,308 issued on Sep. 8, 1992 to Vaughn, et al., discloses a motorcycle towing apparatus for use with a towing vehicle having a support bar which slidably engages a hitch receiver carried by the towing vehicle and having a ramp pivotally connected to the rear end of the support bar wherein the ramp is movable from a first position in which the ramp extends downwardly to the ground to a second position in which the ramp is elevated off the ground to provide clearance for towing, and also having a wheel cradle carried by the support bar to support the front wheel of the motorcycle. A single person can load and unload a motorcycle from the device. However, the tilt is not disconnectable and the motorcycle is not prevented from tilting and tipping over on sharp turns.

U.S. Pat. No. 6,244,813 issued on Jun. 12, 2001 to Cataldo discloses a motorcycle towing device including a platform member with a front end for attachment to the trailer hitch of a land vehicle. An upright member is perpendicularly affixed to the rear end of the platform member. An elevator is selectively raised and lowered upon the upright member by means of a jackscrew positioned atop the platform member. The elevator has a head tube and a pair of pivot bearings positioned at the top and bottom of the head tube. The head tube carries a pivot member. The pivot member has a carriage plate and a pair of pivot arms extending forwardly from the top and bottom thereof for pivotal engagement with the pivot bearings. A pair of wheel engagement arms, for supporting a motorcycle wheel, extend rearwardly from the carriage plate. However, this device has a rather complicated construction.

U.S. Pat. No. 5,620,197 issued on Apr. 15, 1997 to Howes discloses a towing apparatus for a two-wheeled or three-wheeled motorcycle, The apparatus has a support bar which slidably engages a hitch receiver connected to the towing vehicle and having a pivotally connected ramp which, when in a towing position, supports the front wheel. The towing apparatus includes two embodiments, one employing a hydraulic ram to raise the pivotable ramp and the other employing an eye bolt and nut to draw down an arm attached to the pivotable ramp. In either case, support straps are used to create a self-loading, one-person operable device which can be used for running and non-running two-wheeled or three-wheeled motorcycles. This device has the capability of being disassembled and, in such state, this relatively lightweight device is easily stored in its own carrying case. However, the device is made in the form of a kit that requires assembling and disassembling.

U.S. Pat. No. 8,075,012 issued on Dec. 13, 2011 to Perez, et al. discloses a towing device for towing a motorcycle comprising a base having a first end that slides horizontally into a receiver hitch of the vehicle; a platform extending outwardly from a second end of the base; an arc-shaped cradle for cradling a front wheel of the motorcycle. The cradle is divided into a front portion attached atop the platform and a ramp pivotally attached to the front portion of the cradle via a hinge. The ramp can pivot to an up position and a down position, wherein the down position allows the front wheel of the motorcycle to be rolled into the front portion of the cradle, the ramp can be secured in the up position via a securing means. The device also contains a side support component that extends upwardly from the platform and that has a support component for supporting the front wheel of the motorcycle when this wheel is in the cradle.

Thus, in spite of a great variety of motorcycle towing devices, a need still exists in a device of that kind that is simple in construction, inexpensive to manufacture, easy in use, and possesses a function of automatically locking the front wheel in place when it is installed into the front wheel support.

SUMMARY OF THE INVENTION

The present invention relates to a device for towing a motorcycle, in particular to a device for towing a motorcycle behind a land vehicle with a front wheel of the motorcycle off the ground. The device has a platform connectable via a support bar to a hitch receiver at the back of the towing vehicle for supporting the front wheel of the motorcycle in a ground off position. The platform is pivotally connected to the support bar of the device in order to allow the motorcycle steering head to rotate so that the motorcycle tilts as the vehicle turns. The platform has a stationary front stopper for the front side of the wheel supported by the platform and a pivotally rotated rear stopper for automatically locking the front wheel of the motorcycle from behind. The rear stopper is turned into the wheel locking position by the motorcycle wheel itself when the wheel on its way forward rides onto a transverse axle of the rear stopper and through the torque acts on it as on a cam. When the rear stopper is in place, it is kept in the locking position by the rear stopper and the wheel itself.

DETAILED DESCRIPTION OF THE PREFERRED EMBODIMENT OF THE INVENTION

The present invention relates to a device for towing a motorcycle, in particular to a device for towing a motorcycle with a front wheel off the ground for towing behind a land vehicle.

Figure 1:
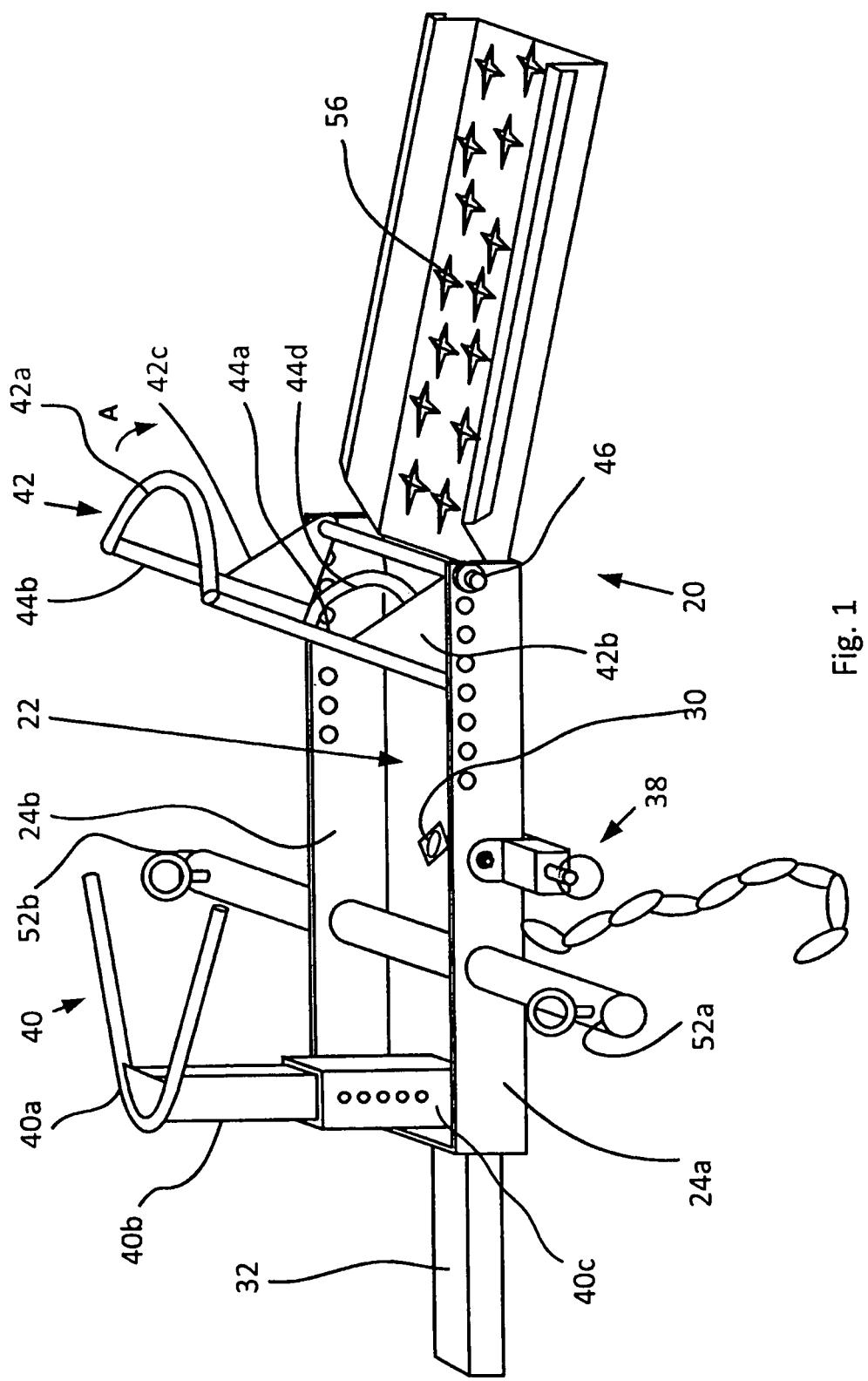
FIG. 1 is a three-dimensional view of the device of the invention for towing a motorcycle.

A three-dimensional view of the device of the invention for towing a motorcycle (hereinafter referred to as "a device" or "a device of the invention") is shown in FIG. 1.

The device, which as a whole is designated by reference numeral 20, consists of a wheel supporting platform 22 with two short side flanges 24a and 24b, which extend upward from the sides of the platform 22 and are spaced from each other to a distance sufficient to provide unimpeded entry of the motorcycle wheel onto the platform 22.

Figure 2:
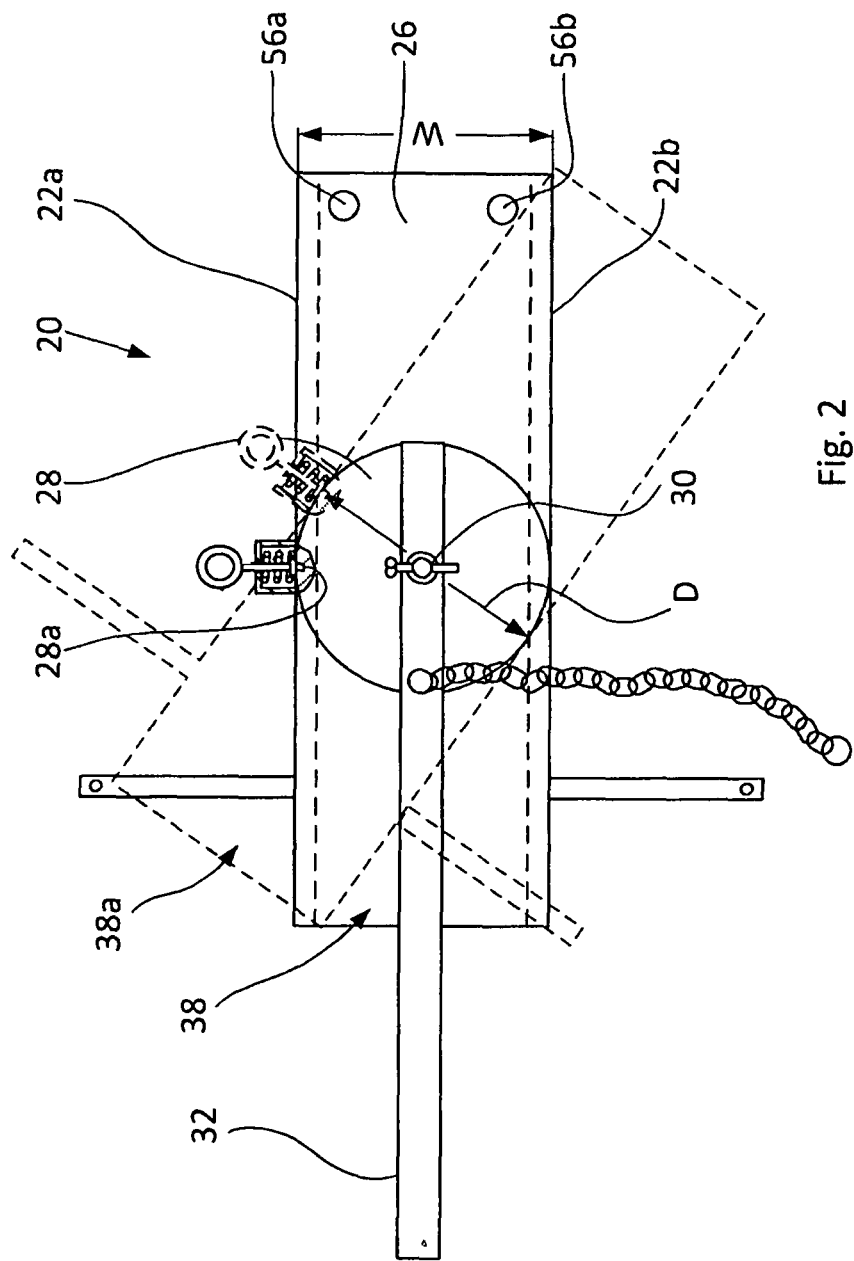
FIG. 2 is a bottom view of the device of FIG. 2.
Figure 3:
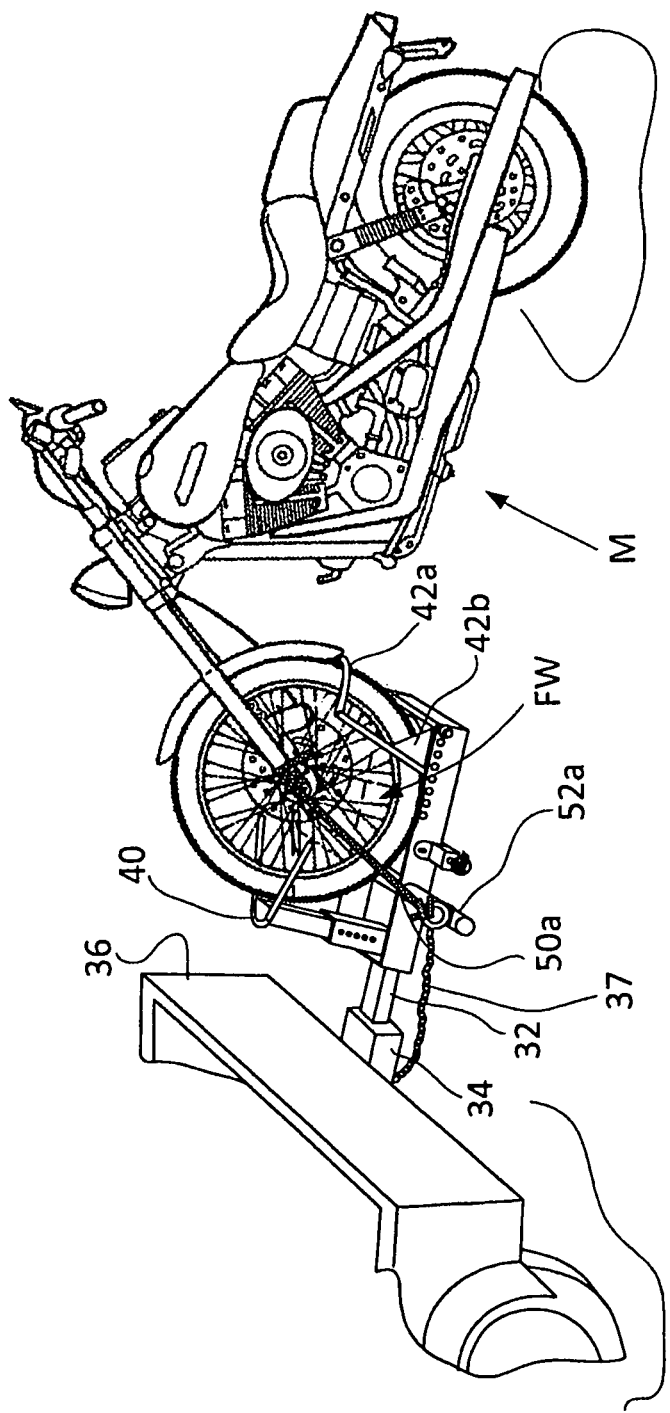
FIG. 3 is a view of the device of the invention with a motorcycle installed in a position ready for towing.

FIG. 2 is a bottom view of the device 20. Attached to the bottom 26 of the platform 22 is a swivel disk 28, which is pivotally installed with respect to the platform 22 on the axle 30 and is rigidly connected to a support bar 32, which, as shown in FIG. 3, extends outward in the axial direction of the platform to a distance sufficient to telescopically engage a hitch receiver 34 at the back of the towing vehicle 36, to which it is to be connected in a conventional manner. FIG. 3 is a three-dimensional view of a motorcycle M in a position ready for towing.

It is recommended that the swivel disk 28 had a diameter D substantially equal to or smaller than the width W of the platform bottom 26 so that its outlines could form an inscribed circle to the side edges 22a, 22b at the bottom of the platform 22. In that case, it would be more convenient to position a releasable disk locking mechanism 38 on one of the vertical flanges, e.g., the flange 24a (FIG. 1) of the platform 22, in the point of tangency of the edge 22a at the bottom 26 of the platform 22 to the circular periphery of the swivel disk.

In FIGS. 1, 2,3, and 4, reference numeral 37 designates a chain which is used as an additional safety means for connection of the device 20 to the towing vehicle 36 (see, in particular, FIG. 3). This chain will hold the device 20 bound to the towing vehicle 36 in case of accidental disconnection of the support bar 32 from the hitch receiver 34.

The releasable disk locking mechanism 38 comprises a spring-loaded pin 38a that can automatically fit into a locking opening 28a formed on the peripheral surface of the swivel disk 28 when the latter turns relative to the spring-loaded pin 38a, and the position of the pin 38a is aligned with the position of the opening 28a. The spring-loaded pin 38a can be put into a working position, at which it is normally urged toward the periphery of the disk, or into a non-working position (not shown), at which it is prevented from entering the disk opening 28a.

Located at the distal end of the platform 22, i. e., at the end closer to the towing vehicle 36, is a front stopper 40 for the front wheel (hereinafter referred to merely as a "wheel") FW of the motorcycle M (FIG. 3). This stopper 40 is made in the form of a substantially horizontally arranged front U-shaped yoke 40a for embracing the wheel FW from the front (FIG. 3). This front yoke 40a is attached to a vertical rod 40b that can telescopically slide in a vertical guide 40c and fixed in a required position.

Located at the rear or proximal end of the platform 22 is a rear stopper 42 for stopping the rear end of the front wheel FW from behind. The rear stopper 42 is made in the form of a U-shaped yoke 42a, which is pivotally supported by the vertical flanges 24a and 24b of the platform 22 on a pivot axle 46. In FIG. 1, for convenience of understanding, the rear stopper 42 is shown in an upraised position, which, as will be explained later, should be assumed automatically when the wheel FW is installed on the platform 22. in reality, prior to installation of the wheel FW of the motorcycle onto the platform 22 the rear stopper 42 should be turned in the counterclockwise direction indicated by the arrow A to clear the passage of the front wheel of the motorcycle over the U-shaped stopper rear stopper to the front stopper 40. This is possible because during rolling of the of the front wheel over the rear stopper its U-shaped part lies on the ramp 56 (see description of the ramp below) and because the width of the U-shaped part is slightly wider than the width of the wheel. Reference numeral 44d designates a lower rear yoke used as an additional support element for the wheel in a locked position.

Figure 4:
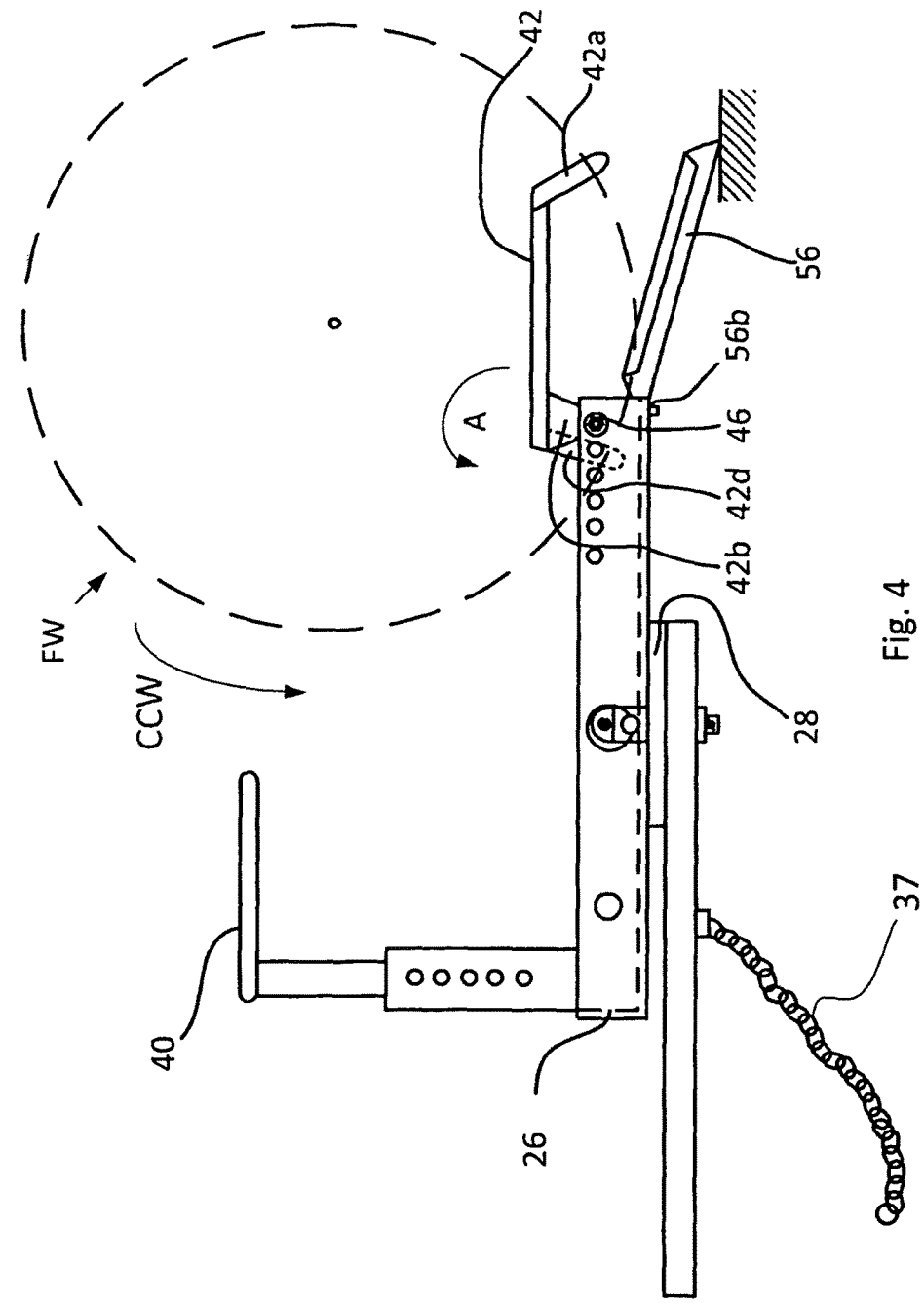
FIG. 4 is a side view of the device of FIG. 1 illustrating the way how the rear stopper automatically locks the wheel in a locked position as the wheel rides over the platform toward the front stopper.

As shown in FIG. 1 and FIG. 4, which is a side view of the device 20 of the invention, the rear stopper 42 has side shields 42b and 42c that embrace the rear part of the front wheel from both sides when the rear stopper 42 assumes the wheel locking position. The rear yoke 42a is supported by the upper ends of two vertical rods 44a and 44b, while the lower ends of the side shields 42b and 42c are rigidly connected to the transverse axle 46, which is pivotally installed in the vertical flanges 24a and 24b of the platform 22.

As can be seen from FIG. 4, which shows automatic positioning of the rear stopper into a wheel locking position, the transverse axle 46 is raised above the floor surface of the platform 22 so that when during rolling of the wheel FW forward towards the front stopper 40 the wheel comes into contact with the transverse axle 46 and moves further in the forward direction, it will generate a torque and will push on the transverse axle 46 as on a cam thus turning the rear stopper in the counterclockwise direction CCW to a position in which the rear yoke 42a will be pressed against the rear side of the wheel and will be locked in the wheel supporting position by the wheel itself (FIG. 3). In other words, the locking of the wheel between two yokes 40a and 42a in the motorcycle towing position on the platform 22 occurs automatically during loading of the wheel FW on the platform 22 of the towing device 10. In other words, the rear stopper 42 functions as a mechanism for automatically locking the wheel from the rear side.

For adjusting the position of the rear stopper 42 the flanges have a number of openings 48a, 48b, 48c (FIG. 5) formed at the rear ends of the side flanges 24a, 24b for reinstallation of the transverse axle 46 in a proper position with regard to the diameter D of the wheel FW.

For fixing the motorcycle M against tilting relative to the platform 22 during towing on sharp turns of the road, the front wheel is secured on the platform of the towing device by tightly tied and flexible straps such as a strap 50a shown in FIG. 3 (another strap is not seen as it is located in the other side of the motorcycle).

The straps are used for keeping the motorcycle M constantly in the upright position during the towing. One end of each strap is tied, e.g., to the lower end of the front choker and the other end to a lateral extension 52a (and 52b for another strap) that project laterally from the sides of the platform 22. Such extensions may be made in the form of tubular rods arranged across the platform 22 in a space between the front end of the wheel in the lock position of the latter and the vertical guide 40c of the front yoke 40a. The ends of the tubular rods project outward from the flanges of the platform and may have holes for hooks that may be attached to the strap tighteners (not shown). The flexible straps may comprise ribbon belts made from a strong fabric.

Similar tilt prevention means may be formed at the rear side of the motorcycle near the rear wheel in the form of flexible straps tightened, e.g., between the tags and the grab bars so as to prevent turning of the steering bar of the motorcycle during towing.

Since in a position with the support bar of the towing device installed and fixed in the hitch receiver of the towing vehicle the rear end of the platform is located at a certain level above the ground, for loading the motorcycle front wheel onto the platform the device is provided with a removable ramp 56 (FIGS. 1 and 4) which has at its front end pins insertable into holes 56a, 56b (FIG. 2) formed at the rear end of the platform.

For towing a motorcycle, the support bar 32 is inserted into the hitch receiver 34 of the towing vehicle, 36, the disk 28 of the swivel mechanism is locked by the locking mechanism 38 against rotation relative to the platform 22, the ramp 56 is connected to the rear end of the platform 22, and the rear stopper 42 of the wheel FW is turned to its extreme position in the clockwise direction for clearing the way of the wheel to the platform. The device is now ready for loading the motorcycle into the towing position.

When the wheel FW of the motorcycle M rides on the platform towards the front stopper 40, it passes over the U-shaped yoke 42a of the downwardly inclined rear stopper 42, pushes on the transverse axle 46 at the rear end of the platform 22 as on a cam, thus developing a torque, and turns the rear stopper, and hence, the rear yoke 42a, in the counterclockwise direction to a position in which the rear yoke 42a is pressed against the rear side of the wheel FW and locked in the wheel supporting position by the wheel itself. This occurs automatically. After the wheel is locked on the platform, the releasable disk locking mechanism 38 is shifted to a position that releases the swivel disk 28 for free turning relative to the platform 22 with the secured wheel. The motorcycle is then additionally fixed on the platform 22 by the tightening straps.

When the towing vehicle makes sharp turns on the crooked road, the platform 22 together with the motorcycle M swivels around the axle 30 relative to the support bar 32, which is rigidly connected to the towing vehicle. The swiveled position of the platform relative to the support 32 and the disk 28 is shown in FIG. 2 by the dash-and-dot lines.

Although the invention has been shown and described with reference to specific embodiment, it is understood that this embodiment does not limit the application of the invention and that any changes and modifications are possible, provided they do not depart from the scope of the patent claims.

The invention claimed is:

1. A device for towing a motorcycle behind a land vehicle with a front wheel of the motorcycle off the ground, the device comprising:
   a support platform for supporting the front wheel of a motorcycle, the front wheel having a front side and a rear side;
   a stationary front stopper for stopping the front wheel in a stopped position from the front side; and
   a mechanism for automatically locking the front wheel from the rear side when the front wheel moves on the support platform to the stationary front stopper, wherein the mechanism for automatically locking the front wheel from the rear side comprises a rear stopper which is pivotally connected to the support platform and has a member onto which the front wheel acts as on a cam for turning the rear stopper into a position of locking the front wheel from the back side when the front wheel moves on the support platform to the stationary front stopper.

2. The device of claim 1, further comprising: a support bar for connection to the land vehicle; and a rotating disk which is rigidly connected to the support bar and pivotally connected to the support platform.

3. The device of claim 2, further comprising a releasable disk locking mechanism installed on the support platform for locking the rotating disk with respect to the support platform and for releasing the rotating disk from the support platform for free pivotal movements of the support platform with respect to the rotating disk.

4. The device according to claim 1, wherein the stationary front stopper comprises a first U-shaped yoke that embraces the front side of the front wheel in a stopped position of the front wheel and the rear stopper comprises a second U-shaped yoke that embraces the rear side of the front wheel from the rear side of the front wheel when the rear stopper is automatically turned into the stopped position for locking the front wheel from the rear side thereof.

5. The device according to claim 1, wherein the member onto which the front wheel acts as on a cam comprises a transverse axle, which is rigidly connected with the rear stopper.

6. The device of claim 5, further comprising: a support bar for connection to the land vehicle; and a rotating disk which is rigidly connected to the support bar and pivotally connected to the support platform.

7. The device of claim 6, further comprising a releasable disk locking mechanism installed on the support platform for locking the rotating disk with respect to the support platform and for releasing the rotating disk from the support platform for free pivotal movements of the support platform with respect to the rotating disk.

8. The device according to claim 7, wherein the stationary front stopper comprises a first U-shaped yoke that embraces the front side of the front wheel in a stopped position of the front wheel.

9. The device according to claim 8, wherein the rear stopper comprises a second U-shaped yoke that embraces the rear side of the front wheel from the rear side of the front wheel when the rear stopper is automatically turned into the stopped position for locking the front wheel from the rear side thereof.

* * * * *